United States Patent [19]
Griffen

[11] 3,762,747
[45] Oct. 2, 1973

[54] GROMMET
[75] Inventor: Thomas J. Griffen, Dearborn, Mich.
[73] Assignee: General Motors Corporation, Detroit, Mich.
[22] Filed: Sept. 25, 1972
[21] Appl. No.: 291,999

[52] U.S. Cl................................. 287/85 R, 74/490
[51] Int. Cl............................................. F16b 7/00
[58] Field of Search...................... 74/490; 287/85 R

[56] References Cited
UNITED STATES PATENTS
2,312,516  3/1943  Alldredge.......................... 287/85 R
2,367,832  1/1945  Riesing................................. 287/85

Primary Examiner—Milton Kaufman
Attorney—Warren E. Finken et al.

[57] ABSTRACT

The drawings illustrate an improved polyurethane grommet having means integrally formed thereon for providing the "rate," "tuning" or damping, and lash take-up characteristics preferred for the efficient interconnection of two adjacent members of a linkage system.

4 Claims, 4 Drawing Figures

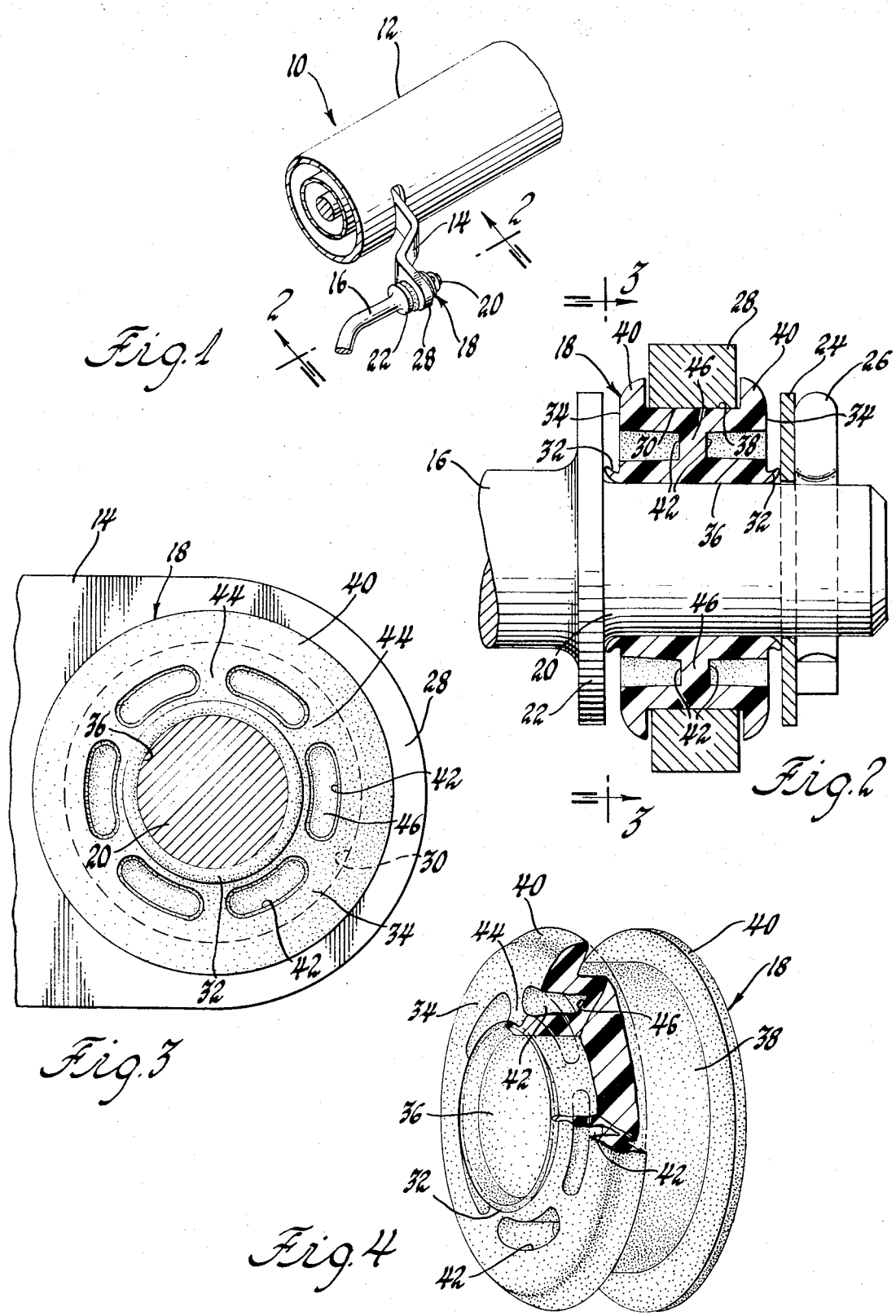

GROMMET

The invention relates generally to transmission shift linkage arrangements and, more particularly, to an improved grommet for use therein.

It is desirable in most linkage systems that the grommets included therein have the ability to deflect properly under load, while absorbing vibrations and noise which tend to be transmitted back through the linkage members. Furthermore, it is desirable that such grommets be sufficiently flexible to facilitate the assembly of adjacent linkage members, while capable of compensating for some axial misalignment therebetween and eliminating lash or end-play therebetween. Heretofore it has been customary to vary the hardness of conventional grommets and employ "wave washers," for example, in conjunction therewith to attempt to meet the above requirements.

Accordingly, an object of the invention is to provide an improved grommet having integrally formed means for satisfying the above-mentioned requirements.

Another object of the invention is to provide an improved grommet having depressions or pockets formed on opposite side faces thereof, with intermediate web formations for effectuating the desired rate and tuning or damping characteristics, while providing a flexibility suitable for the efficient assembly of adjacent members in a linkage system.

A further object of the invention is to provide an improved grommet having annular bell-mouth shaped projections or rings formed on the side faces thereof suitable for being compressed at assembly to eliminate any attendant lash or end-play which may be present in the system.

These and other objects and advantages of the invention will be apparent when reference is made to the following description and accompanying drawings, wherein:

FIG. 1 is a fragmentary perspective view of a transmission shift linkage arrangement embodying the invention;

FIG. 2 is an enlarged cross-sectional view of a portion of the FIG. 1 structure, taken along the plane of line 2—2 of FIG. 1, and looking in the direction of the arrows;

FIG. 3 is a cross-sectional view taken along the plane of line 3—3 of FIG. 2, and looking in the direction of the arrows; and FIG. 4 is a perspective view of the invention with a portion thereof broken away.

Referring now to the drawings in greater detail, FIG. 1 illustrates a linkage arrangement 10, such as a transmission shift linkage mechanism, which may typically include a steering column apparatus 12 from which a lever 14 extends for actuation of a shift rod 16. A grommet 18, formed in accordance with the teachings of the inventon for effectively interconnecting the lever 14 and the shift rod 16, is mounted on an end portion 20 of the shift rod 16, between a flange 22 formed on the rod 16 and a flat washer 24 (FIG. 2) mounted thereon. A retainer member, such as a cotter pin 26, secured to the end portion 20, locates the washer 24 axially. An end 28 of the lever 14 has an opening 30 formed therein for mounting around the grommet 18.

The grommet 18 is formed of any suitable material, such as a polyurethane material having a tensile strength of 4,000 psi minimum, an elongation of 375 percent minimum, a durometer "A" hardness of 84–90, a tension modulus at 300 percent elongation of 1,400 psi minimum, and a resistance to gasoline, oil and grease.

As shown best in FIG. 2, an extruded annular bell-mouth shaped projection or ring 32 is formed on each end face 34 of the grommet 18 around a center opening 36 thereof. Each annular projection 32 is preferably approximately 0.03 inch thick, with an axial length of approximately 0.05 inch from the respective faces 34. The opening 30 of the lever end 28 is mounted on an annular groove 38 formed on the grommet 18 intermediate two annular shoulders 40 formed adjacent the respective end faces 34.

A plurality of depressions or pockets 42 are formed equidistantly (FIG. 3) around each end face 34 of the grommet 18, separated circumferentially by webs 44, and axially (FIG. 2) by a web or wall 46. The side walls of each pocket 42 may include a predetermined taper, such as 2°, to facilitate removal of the grommet 18 from the mold.

The center opening 36 is formed to include a predetermined taper which preferably results in the I.D. at the faces 34 being 0.002–0.003 inch larger than the I.D. at the midpoint of the opening 36 inorder to facilitate assembly of the grommet 18 on the rod end 20 and to thereafter have a satisfactory fit thereon. Additionally, it is desirable that the overall I.D. of the center opening 36 and the O.D. of the annular groove 38 be of such dimensions that respective interference fits are provided with the O.D. of the rod end portion 20 and the I.D. of the lever opening 30, resulting in a substantially zero radial lash relationship therebetween.

It may be realized from FIG. 2 that the projections or rings 32 serve to take up lash or end-play at assembly by virtue of being compressed a predetermined amount between the shoulder 22 and the washer 24 prior to the insertion of the cotter pin 26 into the rod end 20.

The desired load-carrying capacity or rate of the grommet 18 is maintained through the web sections 44 and 46, while tuning or damping, or the ability to absorb vibrations and noise which tend to be transmitted from the shift rod 16 to the lever 14, is accomplished by varying the number and/or size of the depressions 42. The flexibility provided by the depressions 42 also serves to facilitate the assembly of the lever in the annular groove 38 of the grommet 18, while compensating, if necessary, for axial misalignment between the lever 14 and the shift rod 16.

It should be apparent that the improved grommet 18 provides an important function in the efficient operation of any typical linkage arrangement, while eliminating the possibility of improper assembly.

While but one embodiment of the invention has been shown and described, other modifications thereof are possible.

I claim:

1. For use in a linkage assembly including a rod member and a lever to be operatively interconnected, a grommet comprising a body portion having an axial passage formed therein adaptable for mounting on said rod member, an annular groove formed on the outer periphery of said body portion adaptable for the mounting thereon of said lever, a plurality of equally spaced pockets formed in the end faces of said body portion, and extruded compressible means formed on each of said end faces adjacent said axial passage for taking up end-play in the assembly.

2. For use in a linkage arrangement including a rod member and a lever to be operatively interconnected, a grommet comprising a body portion having an axial passage formed therein adaptable for mounting on said rod member, an annular groove formed on the outer periphery of said body portion adaptable for the mounting thereon of said lever, a plurality of equally spaced pockets formed in the end faces of said body portion, and an annular bell-mouth shaped projection formed on each of said end faces adjacent said axial passage.

3. For use in a linkage arrangement including a rod member and a lever to be operatively interconnected, a polyurethane grommet comprising an annular body, an axial passage formed through said annular body adaptable for mounting on said rod member, a decreasing diameter taper formed inwardly from each end face opening of said axial passage to facilitate the assembly of said grommet on said rod member, an annular groove formed on the outer periphery of said annular body adaptable for the mounting thereon of said lever, a plurality of equally spaced arcuate-shaped pockets formed in both end faces of said annular body, a radial web formed intermediate adjacent circumferential pockets, a wall formed intermediate adjacent axial pockets, and an annular bell-mouth shaped ring formed on each of said end faces adjacent said end face openings.

4. A linkage arrangement comprising a rod member having a shoulder formed adjacent one end thereof, a flat washer mounted around said rod member, retainer means for axially positioning said flat washer on said rod member a predetermined distance apart from said shoulder, a lever having an opening formed therein adjacent one end thereof, and a grommet including a body portion having a central passage formed therein mounted on said one end of said rod member, an annular groove formed on the outer periphery of said body portion mounting said grommet in said opening of said lever, a ring of bell-mouth configuration formed on each end face of said body portion, said rings being compressed intermediate said shoulder and said flat washer for eliminating lash in the assembly, and a plurality of arcuate-shaped pockets formed in a spaced relationship around said end faces of said body portion, such spaced relationship resulting in the formation of radial webs intermediate adjacent pockets on each of said end faces and a wall intermediate the planes of adjacent bottom portions of said two pluralities of pockets, the combination of said pockets, radial webs and intermediate wall serving to provide desirable load-carrying and vibration absorbing capabilities.

* * * * *